June 23, 1959   J. S. FRAYNE ET AL   2,891,804
VEHICLE BODY RIGIDIFYING DEVICE AND MOUNTING
FOR PASSENGER HARNESS
Filed Dec. 16, 1954   3 Sheets-Sheet 3
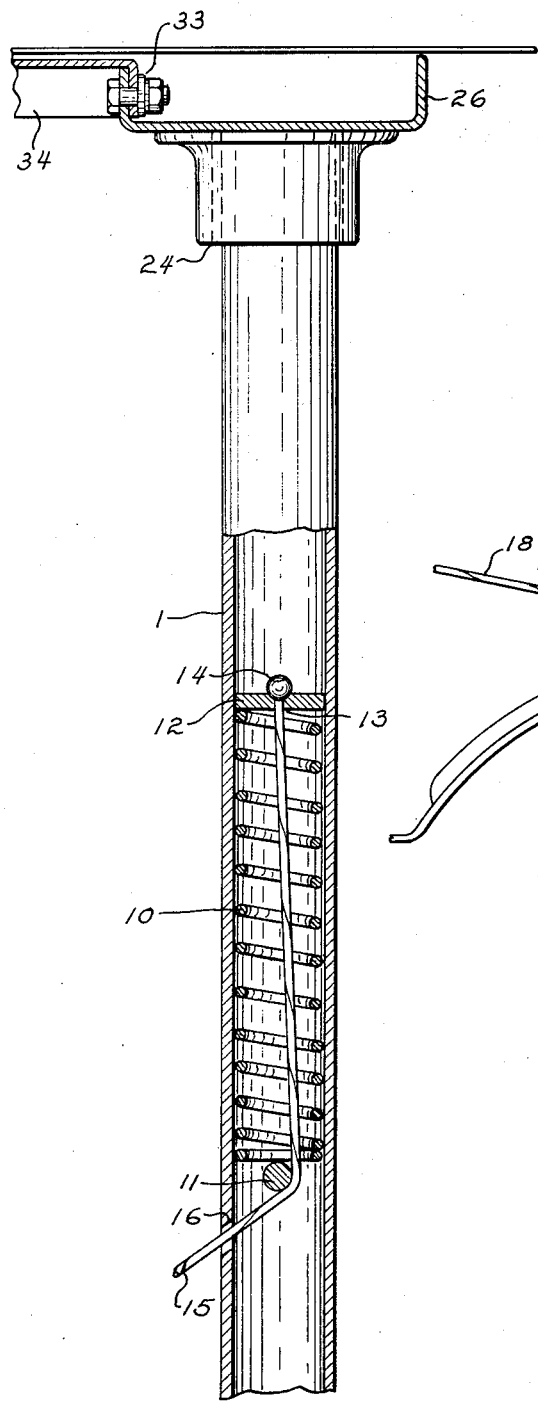
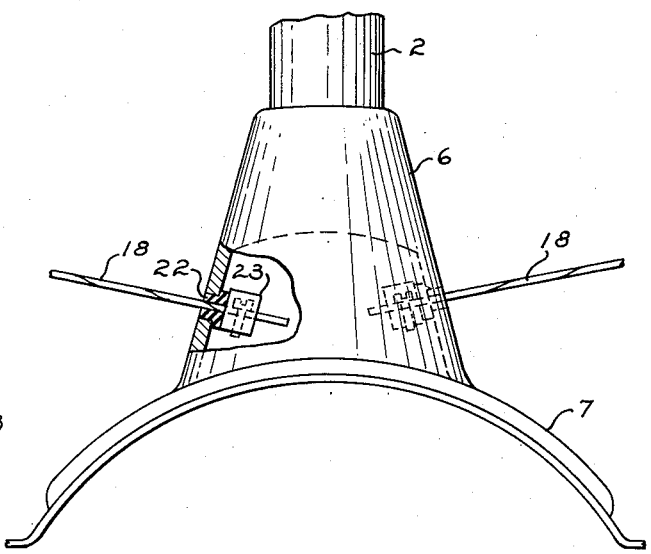
INVENTORS
JOHN S. FRAYNE &
DAVID N. FRAYNE
BY
ATTORNEY

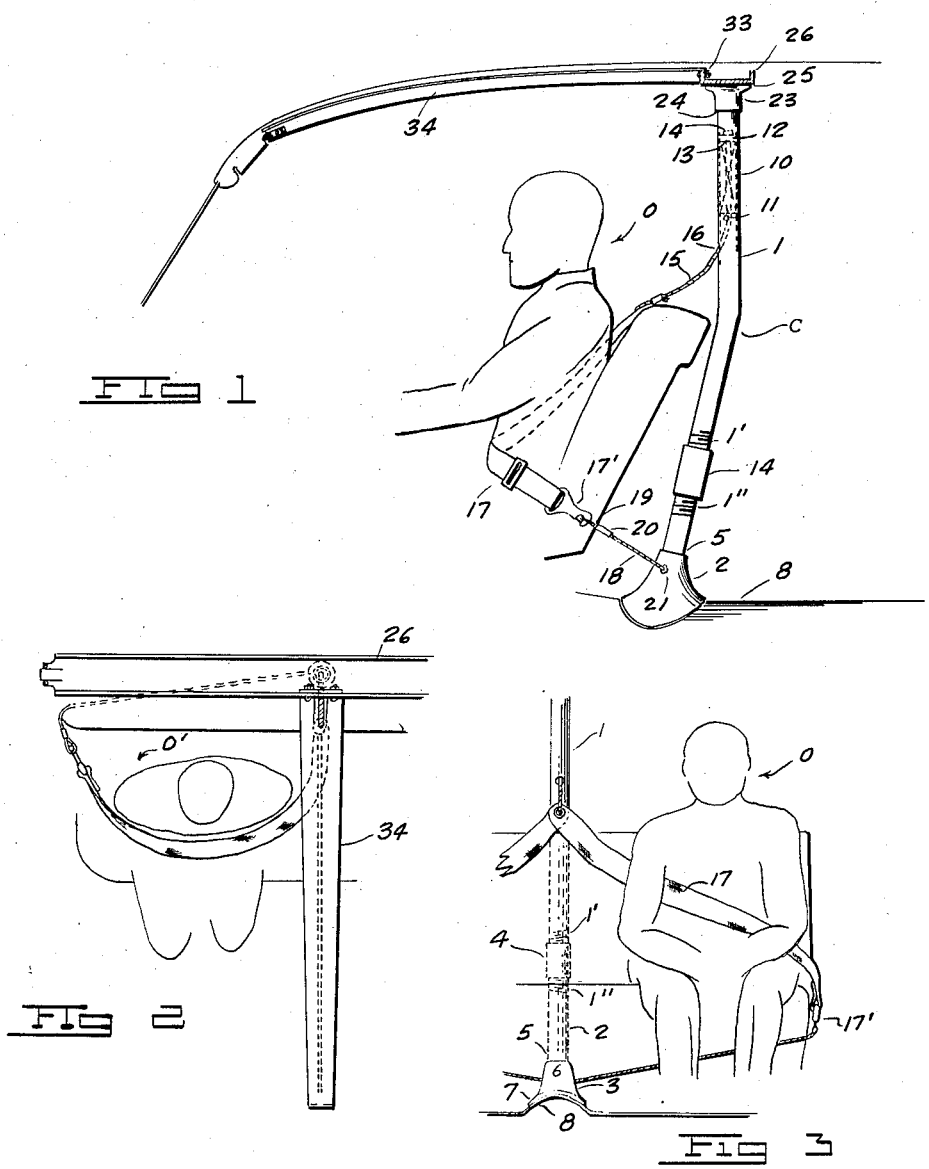

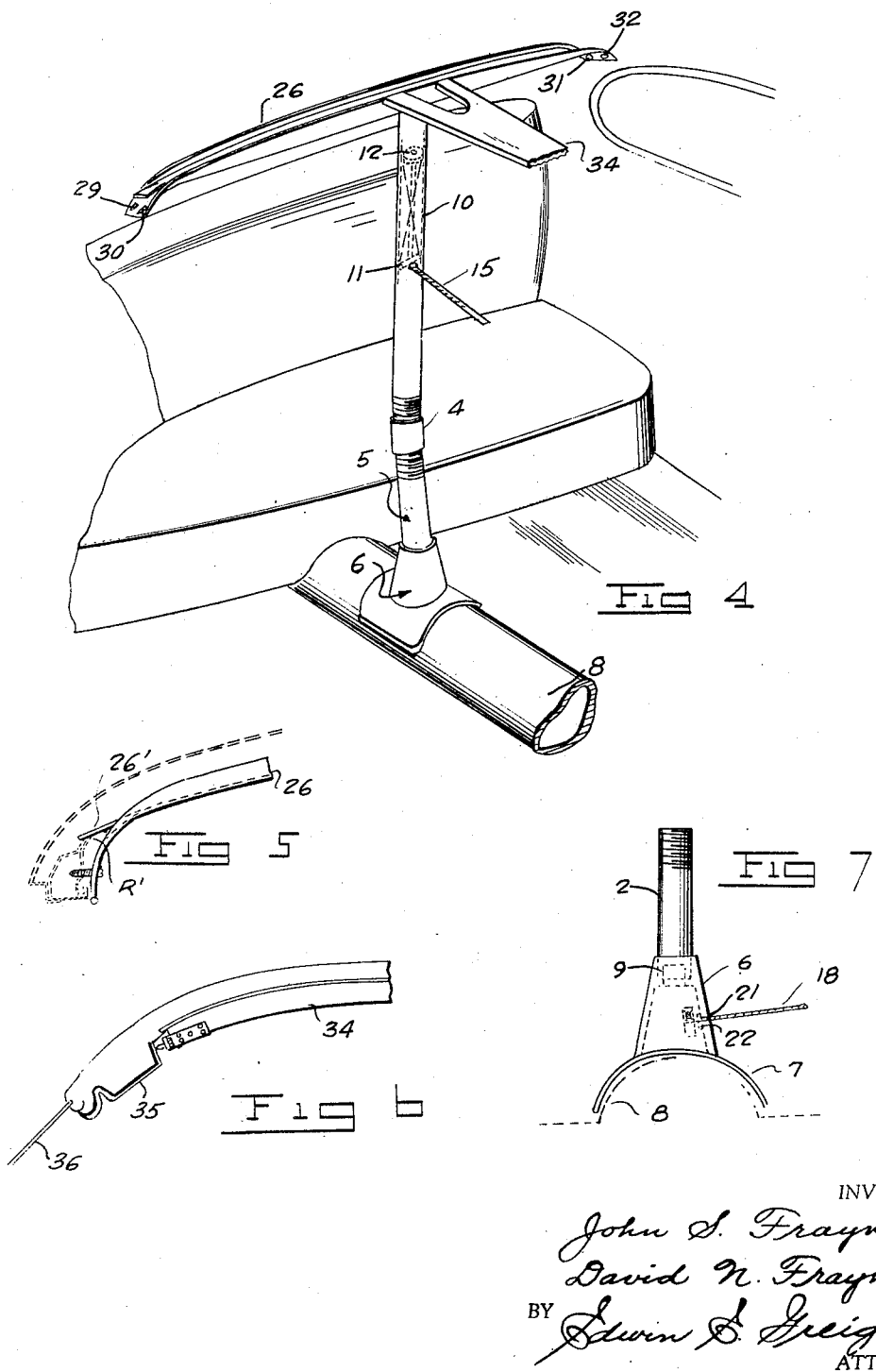

United States Patent Office 2,891,804
Patented June 23, 1959

2,891,804

VEHICLE BODY RIGIDIFYING DEVICE AND MOUNTING FOR PASSENGER HARNESS

John S. Frayne and David N. Frayne, Birmingham, Mich.

Application December 16, 1954, Serial No. 475,788

4 Claims. (Cl. 280—150)

This invention relates to combined means for protecting passengers from being impelled forward in a conveyance upon sudden stopping thereof, such as when involved in traffic accidents, aircraft crashes as well as providing means for rigidifying the structure of the canopy or roof of the conveyance in which the passengers are traveling.

Speed of travel has seemingly become more and more a tremendous factor in our everyday way of living. Air travel has exceeded the speed of sound and automobiles are being provided with more powerful motors with which people are succeeding in driving themselves to destruction. Traffic fatalities are increasing by leaps and bounds while superhighways and more powerful automobiles are being constructed for average people to drive.

The principal object of this invention is to provide a safety appliance that may be manufactured to sell economically thereby enabling a wider distribution among automobile owners who are particularly interested in obtaining a safety device that they themselves may readily install with limited tools.

Another object of this invention is to provide a safety appliance for use in passenger roadway vehicles, although it will be immediately apparent that this device need not be restricted to such use and may be installed in aircraft as well.

Still a further object of the invention is to provide a combined safety device or roll bar which will rigidify the interior of the automobile body against collapse, should the vehicle be turned entirely over in a collision, as well as including a harness means for those passengers of the vehicle who are riding in the forward seat of the automobile.

Another object of the invention is to provide a device that may be easily assembled from a knockdown condition after shipment to its destination.

Still another object of the invention is to provide an appliance that may be, with slight changes, designed at the factory and made to conform to the interior of the styles and bodies of the many automobiles produced by the various manufacturers thereof.

With these objects in view, the invention comprises a safety appliance for protecting passengers while riding in conveyances comprising a perpendicular means positioned within a conveyance having front, side and bottom walls, laterally extending means associated with said perpendicular means and serving to provide rigidity to said perpendicular means, longitudinal means offstanding from said lateral means and harness means carried by said perpendicular means, all as will be explained hereinafter and finally claimed.

In the accompanying drawings, in the several figures of which like parts are similarly designated, Fig. 1 is a side elevation of the safety appliance installed in the rear compartment of a vehicle;

Fig. 2 is a plan view thereof;

Fig. 3 is a front elevation of a portion of the rigidifying means and the harness shown passing over the chest of the driver of the vehicle;

Fig. 4 is a perspective view of the appliance installed in the rear compartment of a vehicle adjacent to the front seat;

Fig. 5 illustrates an embodiment of securing the laterally extending leg to one style of automobile body;

Fig. 6 illustrates an embodiment of the invention wherein the free end of the longitudinally extending leg is securely positioned adjacent to the windshield;

Fig. 7 is a front elevation and an enlarged view of the saddle with the harness connector shown;

Fig. 8 is an enlarged fragmentary view of the column showing the tension spring; and Fig. 9 is an enlarged detailed view of the column base disclosing the clamping feature.

With particular reference to Fig. 1, the standard or perpendicular rigidifying means shown as a cylindrical element 1, extends from within the base 3 to a position substantially adjacent the ceiling of the automobile. For convenience in assembly and adjustment of the column, generally indicated at C, it is constructed of several parts which may be easily threaded together. The column is in effect a turnbuckle which has opposite ends thereof threaded as at 1' and 1" and an interconnecting sleeve 4 to permit adjustment of said threaded ends. The base 3 has an aperture 5 adapted to receive the lower end of said column, see Fig. 7. From an examination thereof, it will be seen that the base 3 has a frusto-conical neck 6 with its lower extremity flared outwardly to resemble a saddle as at 7, the contour thereof adapting itself to the usual crowned portion 8 customary in the present day automobile and which is necessary to provide passage of the drive shaft therebeneath to the differential as well as strengthen the floor thereof. The frusto-conical neck 6 of the base 3 is counterbored to receive the lower extremity of the column 2 and thereby prevent any lateral movement or displacement thereof relative to the base. The base portion 3 may be constructed in any suitable manner, however, malleable iron castings are very practical for this purpose and are preferred therefor.

As illustrated in Figs. 1 and 4, a tension spring 10 is seated on a stop pin 11 which extends through suitable transversely disposed horizontal apertures in column 1. A steel washer 12 provided with an aperture 13 is positioned on said spring and is adapted to receive an an apertured ball-type element 14 to which is secured a suitable length of preformed wire cable 15 of sufficient capacity to withstand the use intended. Tests have demonstrated that a cable capable of withstanding a minimum of 2000 lbs. pressure will be satisfactory. The cable 15 passes through an opening 16, in column 1, and the end thereof is fastened, in any suitable manner to the upper end of a harness 17, which extends under the right arm (see Fig. 3) of the driver of the automobile and diagonally downward, and over the left hip to a suitable snap fastener 17'. An additional extension of pre-formed wire cable 18 which is looped upon itself as at 19 and securely clamped by sleeve 20 is engaged by the snap fastener with the opposite or free end thereof being attached to the base 3 by passing through aperture 21. A rubber bushing 22 is provided with a collar that enters aperture 21. To the free end of said cable is secured a suitable pinch clamp 23'. Obviously, momentum forces will be counteracted by this safety appliance thereby preventing the driver-occupant from being propelled against the steering wheel and/or the windshield of the vehicle in a sudden stop.

As shown in Fig. 2, the occupant of the seat beside the driver is also equipped with the safety harness and since the arrangement of parts is identical except for the harness arrangement, reiteration of the operation thereof appears to be unnecessary.

A socket 23 provided with an annular insulator 24, not shown is positioned over the upper extremity of column 1, said socket being provided with a flanged shoulder 25 which slips into a laterally extending arm 26, see Fig. 4. The lateral member 26 is channelled and its opposite extremities are curved downwardly into a substantially vertical plane (see Fig. 5). A tab 26' is struck from the lateral member 26 and diverges at an angle to the depending extremity of said lateral member and in a plane substantially constant with the greater area of said lateral member. The offstanding end of said tab 26' engages the upper surface of the roof side rail R'. The extremities of said lateral member are suitably apertured at 29, 30, 31 and 32 and are provided with tapping screws (see Fig. 5) which are passed through the depending portion of the lateral member and into the roof side rail of the automobile immediately adjacent to the juncture of the ceiling and side walls thereof, thereby preventing any lateral displacement of the column. Fastened to one of said channel walls, as at 33, is a longitudinally extending leg 34, provided with means for securing the foremost extremity of said leg adjacent to the roof panel. As shown in Fig. 4, the longitudinal leg 34 is bifurcated for the purpose of permitting entry of the usual dome or ceiling light of the vehicle between the legs of the bifurcated portion. The leg 34 may be secured to said channel wall in any suitable manner, however, bolting thereto is preferable for ease of assembly.

In Fig. 6, the means for positioning said leg 34 adjacent to the top of an automobile windshield is shown.

This comprises a header reinforcement 35 positioned adjacent to the windshield 36. It will be apparent to those skilled in the art that kits for assembly of this device will comprise only parts for use in particular makes of cars. It will be apparent that the principle teaching of this invention does not reside in details of this type which must necessarily be changed from time to time as automobile bodies are modified and improved, but partakes of the broad improvement of simultaneously rigidifying the body and which may include a harness means to prevent injury to passengers or occupants of a vehicle.

Various changes and modifications are considered to be within the principle of the invention and the scope of the following claims.

What we claim is:

1. A safety appliance for use in protecting passengers while seated in a vehicle which includes interior front, top, side and bottom walls and a windshield and comprising: a vehicle passenger seat and backrest, an upstanding tubular reinforcing means positioned adjacent to the backrest of said automobile and extending between the interior bottom and top walls, the upper extremity of said reinforcing means being arranged to intersect and position medially thereof a first laterally extending reinforcing element adapted to support the top wall of said vehicle and to which is secured a second supplemental reinforcing means substantially coplanar therewith extending from said first element with the foremost free end of said second element terminating adjacent to said windshield.

2. A safety appliance as claimed in claim 1, wherein said upstanding reinforcing tubular means is provided with means for adjustment thereof relative to the interior bottom and top walls of said vehicle.

3. A safety appliance as claimed in claim 1, wherein, a socket affixed to the upper extremity of said upstanding reinforcing tubular means is arranged to support said first and second named reinforcing elements.

4. A safety appliance as claimed in claim 1, wherein a spring loaded means is positioned for relative limited movement within said tubular reinforcing means, cable means secured to said spring loaded means and passenger confining harness means attached to said cable means, the free end of said harness means being provided with means to be fastened to the lower extremity of said tubular means.

References Cited in the file of this patent

UNITED STATES PATENTS

| | | |
|---|---|---|
| 1,050,874 | Twombly | Jan. 21, 1913 |
| 1,204,144 | Ellis | Nov. 7, 1916 |
| 1,715,379 | Nicholas | June 4, 1929 |
| 2,267,373 | Carlisle | Dec. 23, 1941 |
| 2,386,710 | Pancoe et al. | Oct. 9, 1945 |
| 2,480,335 | Nordmark | Aug. 30, 1949 |